US012031603B2

(12) United States Patent
Dhermand

(10) Patent No.: US 12,031,603 B2
(45) Date of Patent: Jul. 9, 2024

(54) ENERGY ABSORBER FOR AIRCRAFT SEAT

(71) Applicant: Safran Seats, Plaisir (FR)

(72) Inventor: Julien Dhermand, Issoudun (FR)

(73) Assignee: Safran Seats, Plaisir (FR)

( * ) Notice: Subject to any disclaimer, the term of this patent is extended or adjusted under 35 U.S.C. 154(b) by 359 days.

(21) Appl. No.: 16/760,837

(22) PCT Filed: Oct. 18, 2018

(86) PCT No.: PCT/EP2018/078605
§ 371 (c)(1),
(2) Date: Apr. 30, 2020

(87) PCT Pub. No.: WO2019/086264
PCT Pub. Date: May 9, 2019

(65) Prior Publication Data
US 2020/0262563 A1    Aug. 20, 2020

(30) Foreign Application Priority Data
Oct. 31, 2017  (FR) ...................................... 1771148

(51) Int. Cl.
*F16F 7/12*   (2006.01)
*F16F 1/12*   (2006.01)
*F16F 3/02*   (2006.01)

(52) U.S. Cl.
CPC .............. *F16F 7/123* (2013.01); *F16F 1/121* (2013.01); *F16F 1/128* (2013.01); *F16F 3/023* (2013.01); *F16F 2224/0208* (2013.01)

(58) Field of Classification Search
CPC .... F16F 7/12; F16F 7/121; F16F 7/128; F16F 3/023; F16F 7/123

(Continued)

(56) References Cited

U.S. PATENT DOCUMENTS 3,482,872 A * 12/1969 Chamberlain .......... B60R 22/28
                                                  280/805
3,612,223 A * 10/1971 Shiomi ................... F16F 7/128
                                                  293/133

(Continued)

FOREIGN PATENT DOCUMENTS

DE    102006023688 A1   11/2007
EP        2113677 A1   11/2009

(Continued)

OTHER PUBLICATIONS

Machine translation FR 2695177 A1. (Year: 1994).*

(Continued)

*Primary Examiner* — Thomas J Williams
(74) *Attorney, Agent, or Firm* — Kilpatrick Townsend & Stockton LLP

(57) ABSTRACT

The invention relates mainly to an energy absorber for an aircraft seat, notably for a helicopter seat, comprising at least one energy-absorption element having:
 a first anchor point and a second anchor point,
 an energy-absorption zone extending between the first anchor point and the second anchor point, said energy-absorption zone being able to stretch as a tensile load is applied between the first anchor point and the second anchor point,
characterized in that the energy-absorption zone has a meshed structure comprising a plurality of strands connected to one another by junction portions, and in that at least one junction portion provides a junction between at least three strands of said energy-absorption zone.

10 Claims, 5 Drawing Sheets

(58) Field of Classification Search
USPC .................................................. 188/371, 376
See application file for complete search history.

(56) References Cited

U.S. PATENT DOCUMENTS

| | | | | |
|---|---|---|---|---|
| 4,753,772 A | * | 6/1988 | Schmertz | F16L 3/16 |
| | | | | 188/371 |
| 8,087,723 B2 | * | 1/2012 | Honnorat | B60N 2/42736 |
| | | | | 248/548 |
| 2005/0012319 A1 | | 1/2005 | Schulz | |
| 2011/0147562 A1 | * | 6/2011 | Auger | F16M 11/10 |
| | | | | 248/548 |
| 2020/0262563 A1 | * | 8/2020 | Dhermand | F16F 7/123 |

FOREIGN PATENT DOCUMENTS

| | | | | |
|---|---|---|---|---|
| FR | 2695177 A1 | 3/1994 | | |
| FR | 2930520 A1 | 10/2009 | | |
| GB | 1512673 A | * 6/1978 | ............. | B60R 22/28 |
| WO | WO-9412806 A1 | * 6/1994 | ............ | B60N 2/4221 |
| WO | WO-2011008154 A1 | * 1/2011 | ............ | B60R 21/055 |

OTHER PUBLICATIONS

International Patent Application No. PCT/EP2018/078605, International Preliminary Report on Patentability, dated May 5, 2020.
International Patent Application No. PCT/EP2018/078605, International Status Report (and translation) and Written Opinion, dated Nov. 23, 2019.

* cited by examiner

ENERGY ABSORBER FOR AIRCRAFT SEAT

The present invention relates to an energy absorber for an aircraft seat. The invention can be applied particularly advantageously, but not exclusively, with single-space or multiple-space helicopter seats. The helicopter seat may be a pilot seat or a passenger seat.

EP2113677 describes an energy absorber provided with an absorbent portion extending between a first and a second anchor point. The absorbent portion comprises at least one solid wire-shaped element that deforms elastically in the event of a tensile stress below a predetermined threshold and plastically in the event of a tensile stress above said predetermined threshold. The wire-shaped element or elements are provided with a succession of straight segments and circle-arc segments connecting two successive straight segments. The invention aims to improve the control over the elongation of a device of this type.

For this purpose, the invention relates to an energy absorber for an aircraft seat, notably for a helicopter seat, comprising at least one energy-absorption element having:
- a first anchor point and a second anchor point,
- an energy-absorption zone extending between the first anchor point and the second anchor point, said energy-absorption zone being able to stretch as a tensile load is applied between the first anchor point and the second anchor point,
- characterized in that the energy-absorption zone has a meshed structure comprising a plurality of strands connected to one another by junction portions, and in that at least one junction portion provides a junction between at least three strands of said energy-absorption zone.

In one embodiment, the energy-absorption element has a symmetrical configuration about a tension axis passing through the first anchor point and the second anchor point.

In one embodiment, the energy-absorption zone comprises at least one part having, longitudinally, a regular alternation between a range having two junction portions and a range having three junction portions.

In one embodiment, the energy-absorption zone comprises at least one part having, longitudinally, a regular alternation between a range having two junction portions and a range having a single junction portion.

In one embodiment, the energy-absorption zone has an asymmetrical configuration about a tension axis passing through the first anchor point and the second anchor point.

In one embodiment, the energy-absorption zone comprises at least one part having, longitudinally, a succession of ranges of junction portions, each range comprising two junction portions.

In one embodiment, the strands of the energy-absorption zone have varying dimensions and/or orientations and/or material types so as to be adapted to the morphology of an occupant.

In one embodiment, said energy-absorber comprises a plurality of energy-absorption elements stacked on top of one another and configured to be activated in a cascade as a function of the morphology of an occupant.

In one embodiment, the energy-absorption element is formed of a metal material, notably of stainless steel.

The invention further relates to an aircraft seat, notably a helicopter seat, characterized in that it comprises an energy absorber as defined above.

In one embodiment, said aircraft seat comprises:
- two support feet provided with a clip for fixing to rails of the aircraft,
- a base structure having a front edge mounted rotatable with respect to the support feet and a rear edge mounted suspended with respect to the support feet via at least one energy absorber.

In one embodiment, the energy absorber comprises a first anchor point that cooperates with a fixed shaft of a support foot and a second anchor point that cooperates with a fixed shaft of the rear edge of the base structure.

In one embodiment, the fixed shaft of the rear edge of the base structure is inserted into a groove formed in an upright of the corresponding support foot, said groove being suitable for guiding a displacement of the rear edge of the base structure as a tensile load is applied between the first anchor point and the second anchor point.

In one embodiment, said aircraft seat comprises a protective hood for the energy absorber.

Naturally, the different features, variants and/or embodiments of the present invention may be combined with one another in various combinations so long as they are not mutually incompatible or mutually exclusive.

The present invention will be more clearly understood and further features and advantages will become apparent from reading the following detailed description, which includes embodiments that are given by way of illustration with reference to the accompanying drawings and presented by way of non-limiting example and that may serve to complete the understanding of the present invention and the disclosure of the implementation thereof and, if required, contribute to defining it. In the drawings.

Figure 1A:
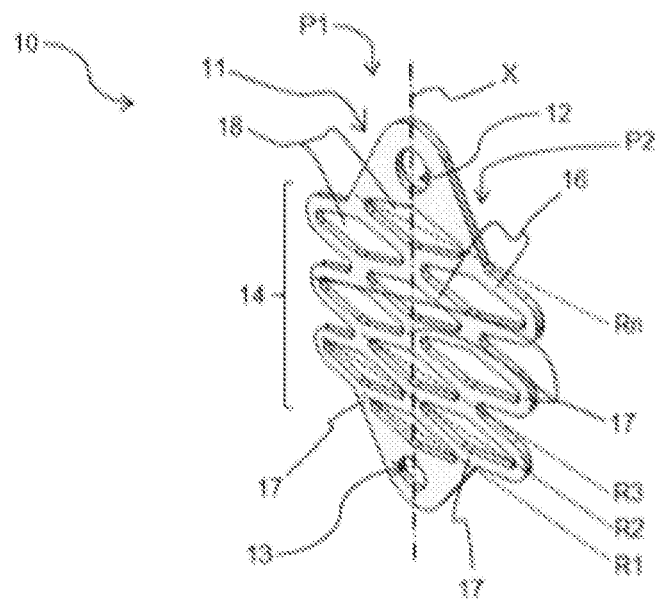
FIGS. 1a and 1b are perspective views of symmetrical energy-absorption elements according to the invention.

It should be noted that, in the drawings, the structural and/or functional elements common to the different embodiments may have the same references. Thus, unless stated otherwise, these elements have identical structural, dimensional and material properties.

Relative terms such as "longitudinal" and "transverse" are understood with reference to a longitudinal elongation direction of an energy-absorption element according to the present invention.

Figure 1B:
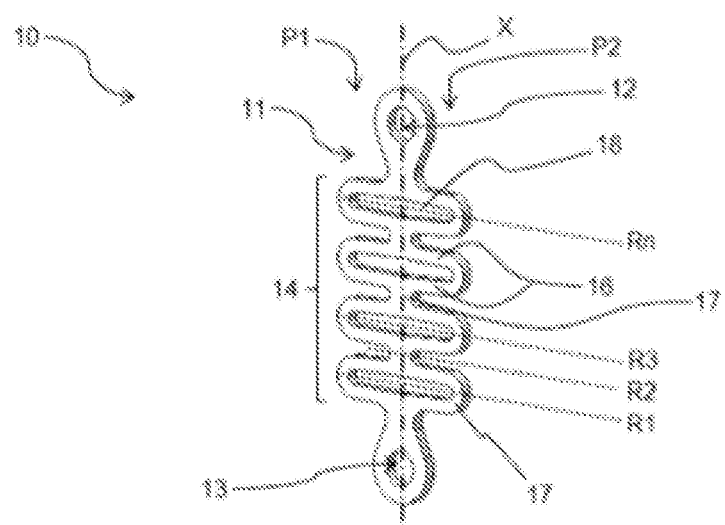
Figure 3:
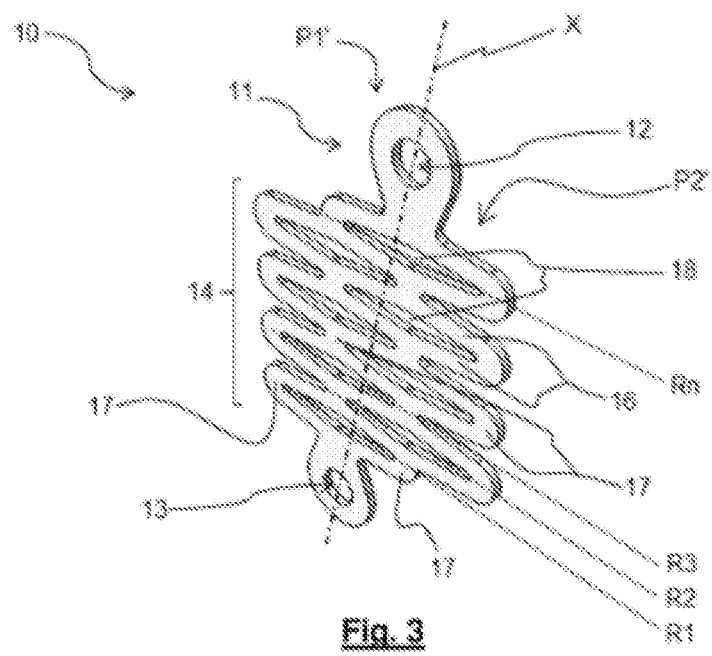
FIG. 3 is a perspective view of an asymmetrical energy-absorption element according to the invention.

FIGS. 1a, 1b and 3 show an energy absorber 10 for an aircraft seat, notably for a helicopter seat, comprising at least one energy-absorption element 11.

This element 11 comprises a first anchor point 12 and a second anchor point 13, as well as an energy-absorption zone 14 extending between the first anchor point 12 and the second anchor point 13. This energy-absorption zone 14 can stretch as a tensile load is applied between the first anchor point 12 and the second anchor point 13.

The energy-absorption zone 14 has a meshed structure comprising a plurality of strands 16 connected to one another by junction portions 17, a strand 16 extending between two successive junction portions 17. Further, at least one junction portion 17 provides a junction between at least three strands 16 of said energy-absorption zone 14. The strands 16 are advantageously rectilinear.

The strands 17 have an orientation at an inclination to the horizontal when unstrained, in such a way that the meshes of the zone 14 have a diamond shape. However, the inclination of the strands 17 may be adapted depending on the application. In particular, the strands 17 may have a horizontal orientation. The strands 17 may also have the same length as or different lengths from one another.

In the embodiment of FIGS. 1a and 1b, the energy-absorption element 11 has a symmetrical configuration about a tension axis X passing through the first anchor point 12 and the second anchor point 13. There is thus an exact correspondence between the two parts P1, P2 located on either side of the tension axis X, which have the same dimensions and the same angles.

In the embodiment of FIG. 1a, the energy-absorption zone 14 has at least one part having, longitudinally, a regular alternation between a range having two junction portions 17 and a range having three junction portions 17. Thus, in the example shown, a distinction is made between a longitudinal succession of ranges R1-Rn, the range R1 having two junction portions 17, then the range R2 having three junction portions 17, then the range R3 having two junction portions 17, and so on along at least part of the energy-absorption element 14, preferably along the entire energy-absorption element 14.

In the embodiment of FIG. 1b, the energy-absorption zone 14 comprises at least one part having, longitudinally, a regular alternation between a range having two junction portions 17 and a range having a single junction portion 17. Thus, in the example shown, a distinction is made between a longitudinal succession of ranges R1-Rn, a range R1 having two junction portions 17, then a range R2 having a single junction portion 17, then a range R3 having two junction portions 17, and so on along at least part of the energy-absorption element 14, preferably along the entire energy-absorption element 14.

Figure 2:
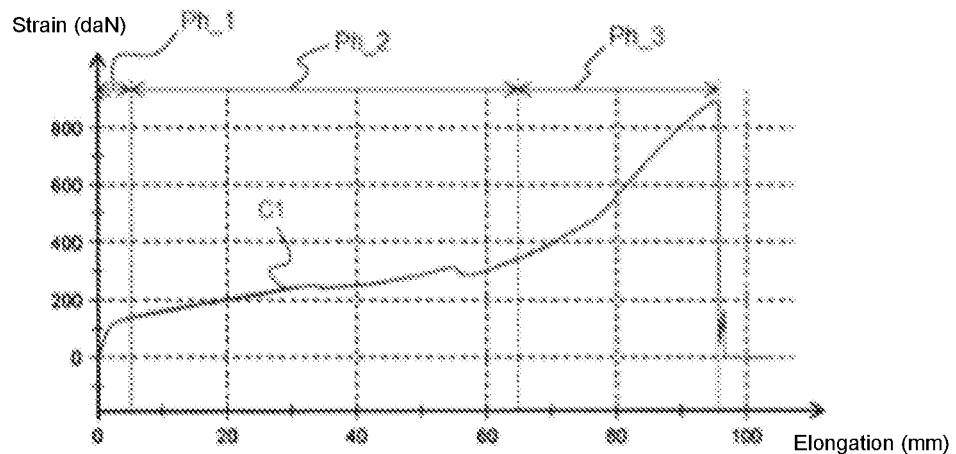
FIG. 2 shows a progression curve of a strain as a function of the stretching of a symmetrical energy absorber.

FIG. 2 shows a progression curve C1 of a strain as a function of the stretching of a symmetrical energy-absorber 10 as a tensile load is applied between the anchor points 12, 13. The curve C1 has a first, steeply rising phase Ph_1 and then an elongation phase Ph_2 in which the variation in the strain is low so that the load experienced by the seat is controlled. During a phase Ph_3, the material deforms until break.

In the embodiment of FIG. 3, the energy-absorption element 11 has an asymmetrical configuration about the tension axis X passing through the first anchor point 12 and the second anchor point 13. In this case, there is no exact correspondence between the two parts P1', P2' located on either side of the tension axis X, which do not have the same dimensions and/or do not have the same angles.

The energy-absorption zone 14 comprises at least one part having, longitudinally, a succession of transverse ranges R1-Rn of junction portions 17. Each range R1-Rn comprises two junction portions 17. Apart from the end ranges, in each of which one junction 17 connects two strands 16 and one junction 17 connects three strands, the intermediate ranges each comprise a junction portion 17 interconnecting two strands 16 and a junction portion 17 interconnecting four strands 16.

Figure 6A:
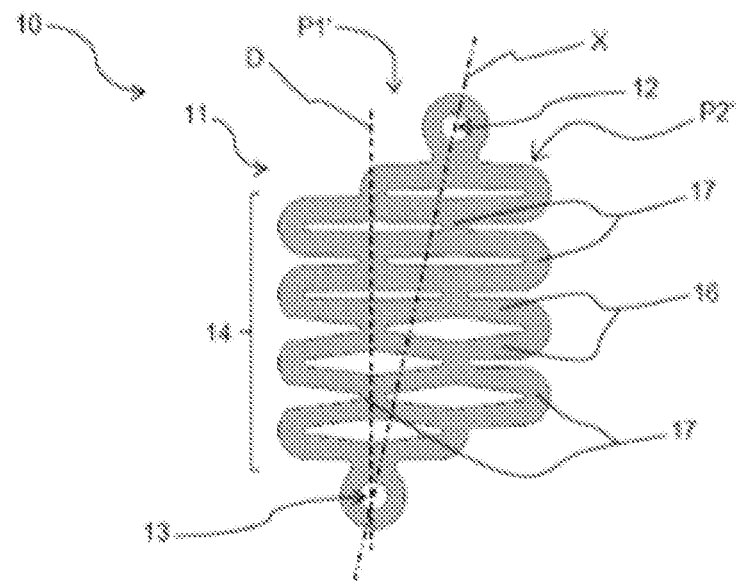
FIGS. 6a and 6b illustrate variant embodiments of an asymmetrical energy absorber that can be adapted to the morphology of an occupant.

In the example shown, the anchor points 12, 13 are mutually offset in a vertical direction D represented in broken lines in FIG. 6a. In a variant, the anchor points 12, 13 may be mutually aligned in this vertical direction D.

Figure 4:
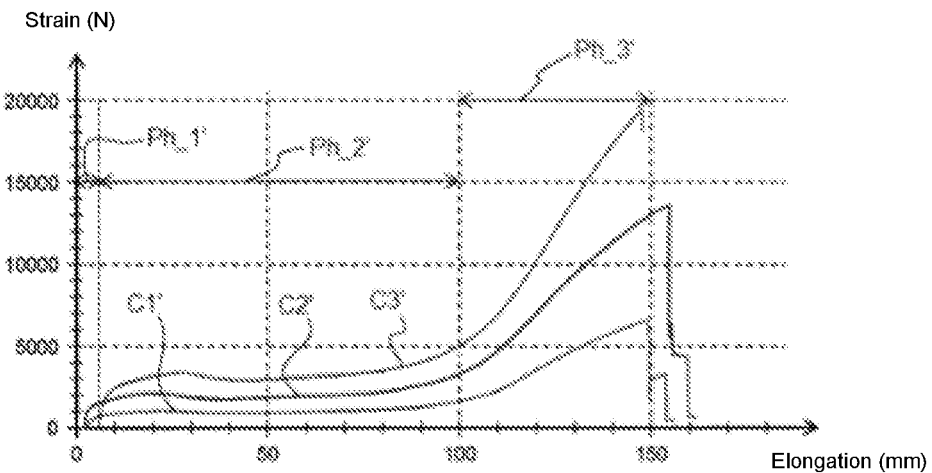
FIG. 4 shows progression curves of a strain as a function of the stretching of an asymmetrical energy absorber for a single element, two stacked elements and three stacked elements each having a thickness of approximately 1.5 mm, respectively.

FIG. 4 shows progression curves C1', C2', C3' of the strain as a function of the stretching of an asymmetrical energy absorber 10 as a tensile load is applied between the two anchor points 12, 13. Each curve has a first, steeply rising phase Ph_1' and then an elongation phase Ph_2' in which the variation in the strain is substantially constant so that the load experienced by the seat is controlled. During a phase Ph_3', the material deforms until break. The curves C1', C2' and C3' were obtained for a single element 11, two elements 11, and three energy-absorption elements 11 stacked on top of one another, respectively. It is noted that the number of elements 11 can be used to adapt the level of the strains experienced by the energy absorber 10.

Figure 5:
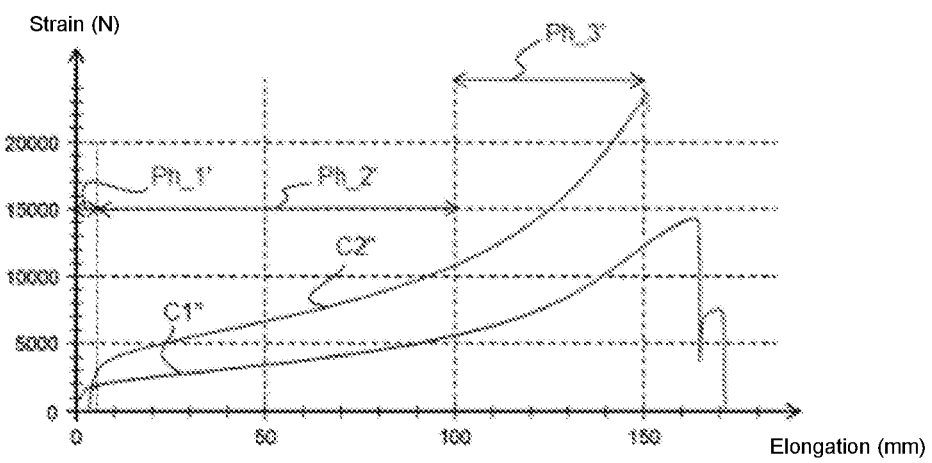
FIG. 5 shows strain curves for an energy-absorption element having a thickness of 3 mm and two stacked energy-absorption elements each having a thickness of 3 mm.

These curves C1', C2', C3' were obtained for elements 11 each having a thickness of approximately 1.5 mm. It is noted that elements 11 having a thickness of 3 mm tend to lose the strain plateau during the phase Ph_3' (cf. FIG. 5, with the curve C1" obtained with an element 11 of 3 mm and the curve C2" obtained with two stacked elements 11 of 3 mm each).

Advantageously, an energy-absorption element 11 thus has a thickness of between 1 mm and 3 mm and preferably of approximately 1.5 mm ("approximately" meaning a variation of 10% more or less around this value). The length of the element 11 is approximately 10 cm when unstrained, in other words before stretching. The element 11 is preferably formed of a metal material, notably of stainless steel. Of course, the material as well as the dimensions, in particular the length of an energy-absorption element 11, may be adapted as a function of the application.

An element 11 may be obtained by laser-cutting a metal plate. The element 11 of FIG. 1a may thus be formed by cutting the outline in a metal plate and then forming three vertical lines of holes 18 in a staggered manner. Thus, the holes 18 in a given line are located between two holes 18 in an adjacent line. The holes 18 may for example take on a diamond shape.

The element 11 of FIG. 1b may be formed by cutting the outline in a metal plate and then forming a vertical line of holes 18 having a rectangular shape.

The element 11 of FIG. 3 may be formed by cutting the outline in a metal plate and then forming two vertical lines of holes 18 in a staggered manner. Thus, the holes 18 in a given line are located between two holes 18 in the adjacent vertical line of holes 18. The holes 18 may for example take on a diamond shape.

It is possible to adjust the configuration of the energy absorber 10 (shape and/or dimensions) for adaptation to the morphologies of the occupants from the $5^{th}$ percentile of women to the $95^{th}$ percentile of men. An attempt is thus made to smooth the strain curve.

Thus, the strands 16 of the energy-absorption zone 14 may have varying dimensions and/or orientations and/or material types so as to be adapted to the morphology of an occupant. In the example shown in FIG. 6a, the meshing of the upper part of the element 11, when unstrained, comprises strands 16 having a horizontal orientation, whereas the meshing of the lower part, when unstrained, comprises strands 16 having an orientation at an inclination to a horizontal direction.

Figure 6B:
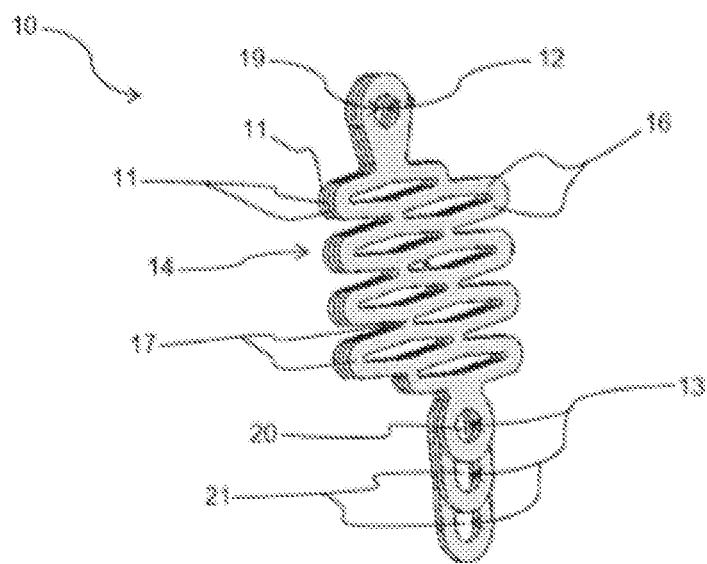

In the embodiment of FIG. 6b, a plurality of energy-absorption elements 11 are stacked on top of one another and configured to be activated in a cascade as a function of the morphology of an occupant.

For this purpose, the first anchor points 12 of the superposed elements 11 have holes 19 that mutually coincide and that are intended to cooperate with a fixed shaft of the seat. Further, the second anchor point 13 of the first element 11 has a circular hole 20 for cooperating with a shaft of the movable seat in the event of a shock leading to stretching of the element 11, as is explained in greater detail below. The following elements 11 comprise anchor points 13 formed by oblong holes 21 having mutually longitudinally offset end edges. The length of the oblong holes 21 increases with increasing distance from the anchor point 13 of the first element 11.

Thus, an occupant in the 5$^{th}$ percentile will tend to activate a single one of the elements 11, while a heavier person in the 95$^{th}$ percentile will tend to activate two or even three energy-absorption elements 11 successively. A leveling effect is thus obtained on the strain curve of the absorber 10. There is thus a progression in the loads experienced in the event of a collision as a function of the morphology of the occupant.

Figure 7:
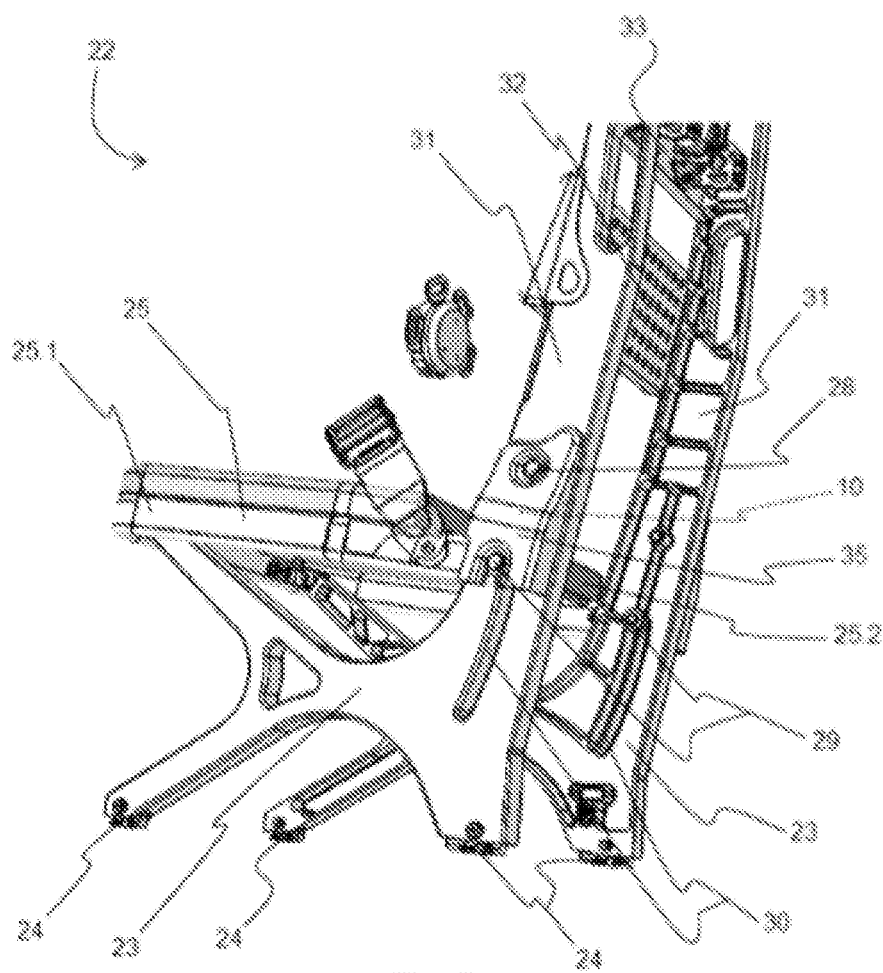
FIG. 7 is a perspective view of a helicopter seat integrating two energy absorbers according to the present invention.

FIG. 7 shows a helicopter seat 22 comprising two support feet 23 provided with a clip 24 for fixing to rails of the aircraft. A base structure 25 has a front edge 25.1 mounted rotatable with respect to the support feet 23 and a rear edge 25.2 mounted suspended with respect to the support feet 23 via at least one energy absorber 10.

For this purpose, a first anchor point 12 of the energy absorber 10 cooperates with a fixed shaft 28 of a support foot 23 and a second anchor point 13 cooperates with a fixed shaft 29 of the rear edge 25.2 of the base structure 25.

The fixed axis 29 of the rear edge 25.2 of the seating structure 25 is inserted into a groove 30 formed in an upright 31 of the corresponding support foot 23. The groove 30 is suitable for guiding a displacement of the rear edge 25.2 of the base structure 25 as a tensile load is applied between the anchor points 12, 13 in the event of a shock.

Thus, in the event of a vertical shock, the base structure 25 is displaced downward subsequent to the stretching of the energy absorber 10, turning about the fixed shaft 28 of the support foot 23. The movement of the base structure under the seat 22 is controlled by way of the groove 30, which guides the shaft 29 of the rear edge 25.2 connected to the anchor point 13 of the absorber 10, the first anchor point 12 fixed to the support foot 23 that forms an undercarriage being immovable.

Advantageously, an energy absorber 10 is arranged on either side of the base structure 25. A protective hood 35 of the energy absorber 10 is mounted on each upright 31 of the support feet 23.

The seat 22 may also comprise a lumbar support 32 associated with an upper backrest portion 33 extending between the two support feet 23. In a variant, it is possible to use a conventional backrest formed by a single piece. In the upper part, the seat 22 comprises a connecting crosspiece between the two support feet 23 as well as a headrest.

So as to implement an energy absorber 10, it is also possible to make partial cuts in the energy absorption zone 14, so as to weaken this zone 14 mechanically and to promote the stretching thereof as a tensile load is applied between the anchor points 12 and 13. These partial cuts may be regular or otherwise, so as to end up obtaining strain curves similar to the curves C1', C2', C3'.

Of course, the invention is not limited to the embodiments described above, which are provided purely by way of example. It encompasses various modifications, alternative forms and other variants that a person skilled in the art may consider within the context of the present invention, and notably all combinations of the different modes of operation described above, which may be taken separately or in combination.

The invention claimed is:

1. An energy absorber for an aircraft seat, notably for a helicopter seat, comprising at least one energy-absorption element having:
    a first anchor point and a second anchor point,
    an energy-absorption zone extending between the first anchor point and the second anchor point, said energy-absorption zone being able to stretch as a tensile load is applied between the first anchor point and the second anchor point,
    characterized in that the energy-absorption zone has a meshed structure comprising a plurality of strands connected to one another by junction portions, and in that at least one junction portion provides a junction between at least three strands of said energy-absorption zone,
    the energy-absorption element having an asymmetrical configuration about a tension axis passing through the first anchor point and the second anchor point, wherein in a front view of the energy absorber, the first anchor point and the second anchor point are mutually offset in a vertical direction, and
    wherein the tension axis extends at an offset angle relative to the vertical direction,
    wherein the first anchor point is aligned with the center of cutouts of a first column of cutouts having a closed contour, and the second anchor point is aligned with the center of cutouts of a second column of cutouts having a closed contour.

2. The energy absorber according to claim 1, characterized in that the energy-absorption zone comprises at least one part having, longitudinally, a succession of ranges (R1-Rn) of junction portions, each range comprising two junction portions.

3. The energy absorber according to claim 1, characterized in that the strands of the energy-absorption zone have varying dimensions and/or orientations and/or material types so as to be adapted to the morphology of an occupant.

4. The energy absorber according to claim 1, characterized in that said energy-absorber comprises a plurality of energy-absorption elements stacked on top of one another and configured to be activated in a cascade as a function of the morphology of an occupant.

5. The energy absorber according to claim 1, characterized in that the energy-absorption element is formed of a metal material, notably of stainless steel.

6. An aircraft seat, characterized in that the aircraft seat comprises at least one energy absorber as defined in claim 1.

7. The aircraft seat according to claim 6, characterized in that the aircraft seat comprises:
    two support feet provided with a clip for fixing to rails of an aircraft,
    a base structure having a front edge mounted rotatable with respect to the support feet and a rear edge mounted suspended with respect to the support feet via at least one energy absorber.

8. The aircraft seat according to claim 7, characterized in that the energy absorber comprises the first anchor point that cooperates with a fixed shaft of one support foot of the two support feet and the second anchor point that cooperates with a fixed shaft of the rear edge of the base structure.

9. The aircraft seat according to claim 8, characterized in that the fixed shaft of the rear edge of the base structure is inserted into a groove formed in an upright of the corresponding support foot of the two support feet, said groove configured to guide a displacement of the rear edge of the base structure as a tensile load is applied between the first anchor point and the second anchor point.

10. The aircraft seat according to claim 6, characterized in that the aircraft seat further comprises a protective hood for the energy absorber.

* * * * *